(12) United States Patent
Häckel

(10) Patent No.: US 11,365,841 B2
(45) Date of Patent: Jun. 21, 2022

(54) MOTOR VEHICLE FLUID LINE

(71) Applicant: TI Automotive (Fuldabrück) GmbH, Fuldabrück (DE)

(72) Inventor: Andre Häckel, Waldeck (DE)

(73) Assignee: TI AUTOMOTIVE (FULDABRÜCK) GMBH, Fuldabrück (DE)

( * ) Notice: Subject to any disclaimer, the term of this patent is extended or adjusted under 35 U.S.C. 154(b) by 420 days.

(21) Appl. No.: 16/318,302

(22) PCT Filed: Jun. 14, 2017

(86) PCT No.: PCT/EP2017/064557
§ 371 (c)(1),
(2) Date: Jan. 16, 2019

(87) PCT Pub. No.: WO2018/019469
PCT Pub. Date: Feb. 1, 2018

(65) Prior Publication Data
US 2019/0242512 A1 Aug. 8, 2019

(30) Foreign Application Priority Data

Jul. 28, 2016 (EP) .................................. 16181684

(51) Int. Cl.
*F16L 53/38* (2018.01)
*F16L 41/02* (2006.01)
*F01N 3/20* (2006.01)

(52) U.S. Cl.
CPC .......... *F16L 41/021* (2013.01); *F01N 3/2066* (2013.01); *F16L 53/38* (2018.01);
(Continued)

(58) Field of Classification Search
CPC ...... F16L 53/38; F16L 41/021; F01N 2240/16
(Continued)

(56) References Cited

U.S. PATENT DOCUMENTS

| | | | | |
|---|---|---|---|---|
| 1,809,714 A | * | 6/1931 | Mathews | F16L 53/38 |
| | | | | 219/522 |
| 2,723,108 A | * | 11/1955 | Butler | F16L 53/38 |
| | | | | 165/61 |

(Continued)

FOREIGN PATENT DOCUMENTS

| | | |
|---|---|---|
| CN | 102913705 A | 2/2013 |
| CN | 106662285 A | 5/2017 |

(Continued)

OTHER PUBLICATIONS

International Search Report, International Application No. PCT/EP2017/064557, dated Jan. 20, 2017, 4 pgs.

(Continued)

*Primary Examiner* — David Bochna
(74) *Attorney, Agent, or Firm* — Dickinson Wright PLLC

(57) ABSTRACT

A motor vehicle fluid line for conducting at least one fluid medium, in particular for conducting urea solutions for SCR catalytic converter systems, at least one fluid-carrying pipe and at least one fluid-carrying connector that is connected to the pipe being provided. The pipe comprises a fluid-carrying outer line and a fluid-carrying inner line that is received in the outer line over at least part of its length L. The connector comprises a first connecting branch that is in fluid communication with the outer line, and comprises a second connecting branch that is in fluid communication with the inner line.

14 Claims, 2 Drawing Sheets

(52) U.S. Cl.
CPC ...... *F01N 2240/16* (2013.01); *F01N 2470/24* (2013.01); *F01N 2610/10* (2013.01); *F01N 2610/14* (2013.01)

(58) Field of Classification Search
USPC .................................................. 285/41, 123.3
See application file for complete search history.

(56) References Cited

U.S. PATENT DOCUMENTS

| | | | | |
|---|---|---|---|---|
| 2,793,280 | A * | 5/1957 | Harvey | F16L 53/38 137/341 |
| 3,986,732 | A * | 10/1976 | Stanley | F16L 39/005 285/121.3 |
| 4,553,023 | A * | 11/1985 | Jameson | F16L 53/38 392/472 |
| 5,017,760 | A * | 5/1991 | Miller | F16L 53/38 219/390 |
| 5,859,953 | A * | 1/1999 | Nickless | F16L 53/38 392/489 |
| 5,931,184 | A * | 8/1999 | Armenia | F16L 55/07 137/312 |
| 6,112,545 | A * | 9/2000 | Stethem | F24F 3/06 285/120.1 |
| 9,512,769 | B2 | 12/2016 | Matsuo et al. | |
| 9,702,492 | B2 | 7/2017 | Borgmeier et al. | |
| 9,890,889 | B2 * | 2/2018 | Lechner | F16L 53/38 |
| 9,927,056 | B2 | 3/2018 | Etscheid et al. | |
| 10,465,831 | B2 | 11/2019 | Mann | |
| 10,473,252 | B2 | 11/2019 | Oberdorfer et al. | |
| 2006/0252292 | A1 * | 11/2006 | Sonderegger | F16L 53/38 439/191 |
| 2007/0246411 | A1 | 10/2007 | Milhas | |
| 2008/0012293 | A1 | 1/2008 | Freiberger et al. | |
| 2009/0242062 | A1 * | 10/2009 | Sawada | F16L 53/38 138/32 |
| 2010/0263740 | A1 * | 10/2010 | Borgmeier | F16L 53/38 137/341 |
| 2011/0241333 | A1 | 10/2011 | Borgmeier et al. | |
| 2013/0277959 | A1 * | 10/2013 | Barthel | F16L 53/32 285/41 |
| 2013/0330065 | A1 * | 12/2013 | Schwarzkopf | F16L 53/38 392/468 |
| 2013/0333772 | A1 * | 12/2013 | Schwarzkopf | F16L 53/38 137/341 |
| 2014/0366974 | A1 | 12/2014 | Etscheid et al. | |
| 2015/0361857 | A1 | 12/2015 | Matsuo et al. | |
| 2016/0116095 | A1 | 4/2016 | Oberdorfer et al. | |
| 2017/0045173 | A1 * | 2/2017 | Wenzel | F16L 53/38 |
| 2017/0234191 | A1 | 8/2017 | Mann | |
| 2021/0140577 | A1 | 5/2021 | Baensch et al. | |

FOREIGN PATENT DOCUMENTS

| | | | |
|---|---|---|---|
| CN | 108516222 A | 9/2018 | |
| CN | 108516223 B | 7/2019 | |
| CN | 112259822 A | 1/2021 | |
| DE | 10 2006 006211 B3 | 9/2007 | |
| DE | 20 2007 015036 U1 | 3/2009 | |
| DE | 20 2011 100991 U1 | 8/2012 | |
| DE | 102017123606 A1 * | 4/2019 | ............. F16L 53/38 |
| JP | S51133011 U | 10/1976 | |
| JP | 5336714 U | 3/1978 | |
| JP | S6313994 A | 1/1988 | |
| JP | 2000027627 A | 1/2000 | |
| JP | 2005325691 A | 11/2005 | |
| JP | 2007211979 A | 8/2007 | |
| JP | 2012513559 A | 6/2012 | |
| WO | 2014198915 A1 | 12/2014 | |
| WO | 2019158713 A1 | 8/2019 | |

OTHER PUBLICATIONS

Aoki, Junji, Machine translation of JP S6313994 (A), entitled "Centralized Delivery Device For Fluid", published Jan. 21, 1988.
Machine translation of JP S51133011 (U), published Oct. 26, 1976; (Title and Abstract not available).

* cited by examiner

MOTOR VEHICLE FLUID LINE

RELATED APPLICATIONS

This application is a 35 U.S.C. § 371 national phase application of International Application No. PCT/EP2017/064557, filed on Jun. 14, 2017, which claims the priority of European Patent Application No. 16181684.8, filed Jul. 28, 2016, the contents of which are incorporated herein by reference in their entirety.

FIELD

The present disclosure relates to a motor vehicle fluid line for conducting at least one fluid medium—in particular for conducting urea solutions for SCR catalytic converter systems, at least one fluid-carrying pipe and at least one fluid-carrying connector connected to the pipe being provided.

BACKGROUND

Within the context of the present disclosure, the connector comprises at least two connecting branches, by means of which the fluid medium—in particular the urea solution—is conducted away or passed on. The fluid medium is expediently conducted to a unit via at least one connecting branch, the unit preferably being a metering device. The metering device makes it possible to supply the fluid medium in a metered fashion and, according to a recommended embodiment, to supply the fluid medium or urea solution to an SCR catalytic converter system in a metered fashion. In motor vehicles—in particular in vehicles comprising a diesel engine—an SCR catalytic converter system comprising an SCR catalytic converter for treating exhaust gases is generally provided (SCR: Selective Catalytic Reduction). In order to effectively reduce the nitric oxides in the exhaust gas of a motor vehicle, a urea solution is added to the exhaust gas in a metered fashion upstream of an SCR catalytic converter.

Different embodiments of motor vehicle fluid lines of the type mentioned at the outset are known in practice and are in particular also known in connection with the conduction of urea solutions for SCR catalytic converter systems. In this case, the connector connected to the pipe can comprise two connecting branches for the urea solution, the urea solution being supplied to a metering device via these connecting branches in order to supply the urea solution to an SCR catalytic converter system in a metered fashion in each case. In this case, the pipe comprises just one inner duct, which is surrounded by the pipe wall. The fluid medium or the urea solution leaves the inner duct of the pipe and enters the two connecting branches of the connector. When the engine of a motor vehicle comprising such an SCR catalytic converter system is switched off, the SCR system, in particular the pipe and the connector, is emptied or the urea solution is removed therefrom. We have discovered that if the system is then refilled with urea solution later on, eddies and/or bubbles occur in the flow of liquid, in particular in the region of the connector and in the region of the connecting branches, and interfere with uniform flow of the urea solution and therefore can adversely affect the entire SCR system.

SUMMARY

The technical problem of the present disclosure is to provide a motor vehicle fluid line which provides more uniform flow and preferably prevents eddies or bubbles in the flow of liquid.

In order to solve this technical problem, the present disclosure provides a motor vehicle fluid line for conducting at least one fluid medium, in particular for conducting urea solutions, for SCR catalytic converter systems, at least one fluid-carrying pipe and at least one fluid-carrying connector that is connected to the pipe being provided, the pipe comprising, over at least part of its length L, a fluid-carrying outer line and a fluid-carrying inner line that is received in the outer line and extends along the outer line, and the connector comprising at least one or a first connecting branch that is in fluid communication with the outer line, and at least one or a second connecting branch that is in fluid communication with the inner line.

According to a particularly recommended embodiment of the present disclosure, the pipe or the outer line and/or the inner line is made of plastics material or is substantially made of plastics material. The connector connected to the pipe is expediently made of plastics material or is substantially made of plastics material.

Within the context of the present disclosure, the pipe is directly connected to the fluid-carrying connector. A preferred embodiment of the present disclosure is characterized in that the outer line and/or the inner line is/are bonded to the connector. In this connection, a very preferred embodiment of the present disclosure is characterized in that the outer line and/or the inner line is/are connected to the connector by means of a spin welded connection and/or by means of a laser welded connection.

The present disclosure is based on the knowledge that, by dividing the pipe as per the present disclosure into a fluid-carrying outer line and a fluid-carrying inner line, non-uniform flow conditions in the connector, and in particular in the region of the two connecting branches, can be minimized or virtually avoided. This primarily also applies to a process of filling the motor vehicle fluid line according to the present disclosure with a fluid medium or a urea solution. In this case, in contrast to the fluid lines known in practice, a highly uniform flow of the fluid medium can be observed, especially in the region of the connector, in particular in the transition region between the pipe and the connecting branches. In this connection, the embodiment in which the outer line and the inner line and the connector are made of plastics material or are substantially made of plastics material and the outer line and the inner line are bonded to the connector or are preferably connected to the connector by means of a spin welded connection or a laser welded connection is also especially important. This type of connection surprisingly contributes to the homogenization of the flow in the region of the connector or in the region of the connecting branches.

Within the context of the present disclosure, the outer line of the pipe is arranged in parallel with or substantially in parallel with the inner line of the pipe. According to a particularly preferred embodiment of the fluid line according to the present disclosure, the outer line and the inner line are arranged coaxially with or substantially coaxially with one another. Within the context of the present disclosure, the cross sections of the outer line and of the inner line are arranged concentrically or concentrically with respect to one another. This coaxial or concentric arrangement of the outer line and the inner line is advantageous in that the fluid medium or the urea solution can be heated in a highly uniform manner in both the outer line and in the inner line when the pipe is heated, as is preferable. In addition, this embodiment is conducive to uniform flow conditions at the two connecting branches.

According to the present disclosure, the pipe comprises, over at least part of its length L, the fluid-carrying outer line and the fluid-carrying inner line that is received in the outer line. In this case, within the context of the present disclosure the pipe is formed as the outer line and the inner line in the region thereof that is connected to the connector comprising the two connecting branches. According to one embodiment of the present disclosure, the pipe is formed as the outer line and the inner line over at least 50% of its length L, preferably over at least 60% of its length L and preferably over at least 70% of its length L. Within the context of the present disclosure, the pipe is merely formed as a single fluid duct over part of its length L. In this part of its length L, the pipe therefore comprises just one inner duct or fluid duct, which is surrounded by the pipe wall. Furthermore, within the context of the present disclosure, this part of the pipe comprising the single fluid duct directly transitions into the portion of the pipe comprising the outer line and the inner line. In this case, the inner line therefore protrudes into the fluid duct or inner duct of the pipe, so to speak. It has already been pointed out above that, according to a preferred embodiment, the two lines or the outer line and the inner line are arranged coaxially or substantially coaxially with one another in the portion of the pipe that comprises the outer line and the inner line.

Within the context of the present disclosure, the fluid medium—in particular the urea solution—flows through the outer line and the inner line in the same direction and expediently in the direction of the connector comprising the at least two connecting branches. In this respect, the fluid line according to the present disclosure differs from fluid lines known per se in practice in that a fluid medium flows through two parallel pipes or coaxial pipes in counterflow. In these pipes that are known in practice, a fluid medium that is conducted through an outer line is used to control the temperature of the fluid medium conducted through the inner line, or vice versa. Within the context of the present disclosure, merely targetedly controlling the temperature by means of a fluid medium flowing in the outer line and/or in the inner line is preferably not provided. Within the context of the present disclosure, a fluid medium therefore flows through both the outer line and the inner line without the presence of a temperature-controlling medium. A preferred embodiment of controlling the temperature of or heating the fluid line according to the present disclosure or the pipe of aid fluid line is described in the following.

According to a recommended embodiment of the present disclosure, the pipe is heated over at least part of its length L, preferably over its entire length L or over substantially its entire length L. The fluid line according to the present disclosure is preferably heated or the pipe is heated in particular when the fluid medium flowing therethrough is a urea solution or an aqueous urea solution for an SCR catalytic converter system. Such a urea solution or aqueous urea solution is disadvantageous in that urea freezes and partially crystallizes out at temperatures below −11° C. As a result, the further functionally reliable supply of the urea solution is hindered or completely blocked. Consequently, effective reduction of nitric oxides in the exhaust gas of the motor vehicle in question is reduced or prevented. In order to avoid this disadvantage, it is expedient to heat the pipe carrying the urea solution.

According to a particularly recommended embodiment of the fluid line according to the present disclosure, the outer line comprises at least one heating means, preferably at least one heating wire. The outer line is expediently surrounded by this heating means or by the at least one heating wire. It is advisable for at least one heating wire to be wound around the outer line in the shape of a helix or spiral. By means of this at least one heating wire, the outer line is expediently electrically heated and the heating wire is connected to a power source for this purpose. According to another variant of the present disclosure, the pipe can be heated via at least one electrically heated planar heating means, in particular by an electrically heated heating foil, by electrically heated heating tape or by printed heating structures. The planar heating means is then expediently wound around the outer line of the pipe. In this respect, the present disclosure is based on the knowledge that, when the pipe is divided as per the present disclosure into the outer line and the inner line, the outer line is heated to a sufficient extent by means of at least one heating means or by means of at least one electrical heating wire or planar heating means. As a result, the temperature of the urea solution carried through the inner line can also be controlled to a sufficient extent in order to prevent it from freezing.

According to a tried and tested embodiment of the present disclosure, the connector that is connected to the outer line and the inner line is also heated, preferably electrically. In this case, at least one heating means or electrically heatable heating means is expediently also wound around the connector. However, it is also possible for the connector not to comprise its own heating means.

A preferred embodiment of the motor vehicle fluid line according to the present disclosure is characterized in that the pipe is surrounded by a protective pipe. In this case, the pipe and the protective pipe are expediently arranged coaxially with or substantially coaxially with one another. By way of example, one embodiment of the present disclosure is characterized in that the protective pipe surrounding the pipe is formed as a corrugated pipe. According to a tried and tested embodiment of the present disclosure, the protective pipe surrounds the outer line and the outer line in turn surrounds the inner line. The protective pipe, outer line and inner line are then preferably arranged coaxially with or substantially coaxially with one another. Within the context of the present disclosure, the protective pipe, the outer line and the inner line are oriented coaxially with one another in section.

A particularly recommended embodiment of the present disclosure is characterized in that the connector comprises at least two fluid ducts and preferably at least two parallel or substantially parallel fluid ducts, each of which are connected to a connecting branch of the connector. Within the context of the present disclosure, the two fluid ducts form the extension of the outer line and the inner line of the pipe, so to speak, and are expediently formed as a linear extension of the outer line and the inner line. The fluid ducts of the connector are preferably also formed as an outer fluid duct and an inner fluid duct, the outer fluid duct surrounding the inner fluid duct. It is recommended that the two fluid ducts (outer fluid duct and inner fluid duct) are arranged coaxially with one another. According to a recommended embodiment of the present disclosure, the fluid ducts (inner fluid duct and outer fluid duct) are directly connected to the connecting branches of the connector. According to one variant, one or at least one connecting branch of the connector is oriented transversely and preferably perpendicularly to the longitudinal axis of the pipe and to the longitudinal axis of the connector. It is recommended that one or at least one connecting branch of the connector is formed as a linear extension of the pipe or of a fluid duct of the connector. This is expediently the connecting branch that is connected to the inner fluid duct of the connector. A connecting branch that is arranged transversely or perpendicularly to the longitudinal axis of the pipe and to the longitudinal axis of the connector is preferably connected to the outer fluid duct of the connector.

Within the context of the present disclosure, a metering device for supplying the fluid medium in a metered fashion is connected to each connecting branch of the connector or to both connecting branches of the connector. According to particularly preferred embodiments of the present disclosure, a metering device for an SCR catalytic converter system is provided on each connecting branch of the connector in order to supply urea solution in a metered fashion. In this case, at least one metering device is expediently arranged in the engine compartment of the associated motor vehicle.

The present disclosure also relates to providing a method for producing a motor vehicle fluid line, a connector being bonded to an inner line, the unit consisting of the connector and the inner line then being connected to the outer line, in which the inner line is introduced or inserted into the outer line and the outer line is then bonded to the connector. Within the context of the present disclosure, the inner line and/or the outer line are made of plastics material or are substantially made of plastics material. Furthermore, within the context of the present disclosure, the inner line and/or the outer line is/are produced by means of extrusion. According to a preferred embodiment of the present disclosure, a second connector is connected to the outer line upstream of where it connects to the unit consisting of the connector and the inner line, this second connector preferably also being bonded to the outer line. The two units consisting of the first connector and the inner line and of the second connector and the outer line are then interconnected such that the inner line is introduced or inserted into the outer line and the outer line is then bonded to the first connector. According to a recommended embodiment of the present disclosure, the first connector and/or the second connector are formed as quick connectors. The first connector and/or the second connector are preferably produced by means of an injection molding. As already set out above, a particularly preferred embodiment of the method according to the present disclosure is characterized in that the inner line is connected to the connector or the first connector by a spin welding method or a laser welding method, and/or in that the outer line is connected to the connector or to the first connector by a spin welding method or by a laser welding method. The connector particularly preferably comprises a laser-transparent material. The outer line and the second connector are preferably also connected by means of a spin welding method or a laser welding method.

The present disclosure is based on the knowledge that, in a motor vehicle fluid line according to the present disclosure, uniform flow of the fluid medium or the urea solution flowing therethrough can always be maintained and without any disturbing eddies or bubbles in the fluid medium. This particularly also applies when filling the motor vehicle fluid line according to the present disclosure of an SCR catalytic converter system. Above all, in the fluid lines according to the present disclosure, inequalities in the flow in the connection region between the pipe and the connector can be minimized or practically avoided. In the solution according to the present disclosure, adverse effects on the SCR catalytic converter system due to flow inequalities can therefore be largely ruled out. Nevertheless, it is also possible to heat or electrically heat the fluid line according to the present disclosure and the connector connected to the outer line and to the inner line in a simple manner and without problems.

The fluid medium flowing through both the outer line and the inner line can be effectively heated or the temperature thereof can be effectively controlled. It should also be mentioned that the fluid line according to the present disclosure can be produced with a comparatively small amount of effort and relatively low costs. It must also be highlighted that the above-described advantages of the fluid line according to the present disclosure also advantageously include the preferred bond between the components, in particular by means of spin welding or laser welding.

BRIEF DESCRIPTION OF THE DRAWINGS

The present disclosure will be described in more detail in the following on the basis of the drawings that show just one embodiment, in which.

DETAILED DESCRIPTION

Figure 1:
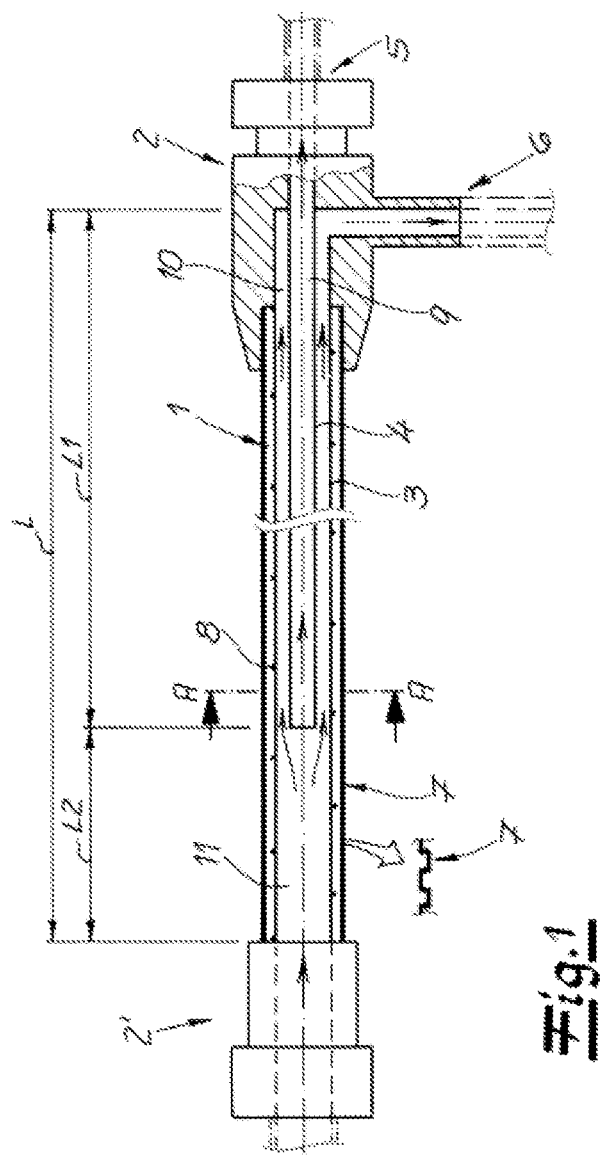
FIG. 1 is a schematic sectional side view of the motor vehicle fluid line according to the present disclosure, and FIG. 2 schematically shows a section A-A through the subject matter of FIG. 1.
Figure 2:
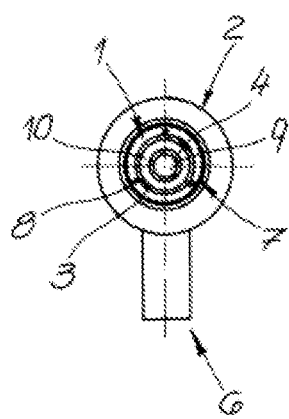

The figures show a motor vehicle fluid line according to the present disclosure for conducting at least one fluid medium and preferably for conducting a urea solution for an SCR catalytic converter system. In the embodiment, the fluid line according to the present disclosure comprises a fluid-carrying pipe 1 and a fluid-carrying connector 2 that is connected to said pipe 1. Preferably and in the embodiment, a connector 2' or a second connector 2' is also connected to the other end of the pipe 1.

The pipe 1 comprises a fluid-carrying outer line 3 and a fluid-carrying inner line 4 that is received in the outer line 3 and extends along the outer line 3 over part L1 of its length L. Expediently and in the embodiment, the outer line 3 is arranged in parallel with the inner line 4 and the outer line 3 and the inner line 4 are preferably arranged coaxially with one another. According to a preferred embodiment and in the embodiment, the pipe 1 is merely in the form of a single fluid duct 11 over a second part L2 of its length L. In this case, the pipe wall of the pipe 1 therefore only surrounds a fluid duct 11 that is not subdivided.

In the embodiment, a fluid medium—preferably urea solution—flows through the outer line 3 and the inner line 4 in the same direction. This direction of flow has been shown in FIG. 1 by arrows in both the outer line 3 and in the inner line 4. The fluid medium or the urea solution therefore flows towards the connector 2.

According to a preferred embodiment and in the embodiment, the pipe 1 is directly connected to the fluid-carrying connector 2 and is preferably and in the embodiment bonded to the connector 2. In this case, according to recommendation and in the embodiment, both the outer line 3 and the inner line are bonded to the connector 2. The outer line 3 and the inner line 4 are preferably connected to the connector 2 by means of a spin welding connection or a laser welding connection.

According to a very preferred embodiment and in the embodiment, the pipe 1 is formed so as to be heated. In this case, according to recommendation and in the embodiment, the outer line 3 is surrounded by an electrically heatable heating wire 8. Only the outer line 3 is therefore provided with a heating means or with a heating wire 8, and, within the context of the present disclosure, as a result of heating said pipe, the temperature of the fluid medium in the inner line 4 can also be sufficiently controlled. Expediently and in the embodiment, the pipe 1 is surrounded by a protective pipe 7, this protective pipe 7 being formed as a corrugated pipe according to recommendation and in the embodiment.

It can be seen in FIG. 1 in particular that the connector 2 comprises two parallel fluid ducts 9, 10, which preferably and in the embodiment form a linear extension of the outer line 3 and the inner line 4. In this case, the inner fluid duct 9 corresponds to a linear extension of the inner line 4 and the outer fluid duct 10 corresponds to a linear extension of the outer line 3, the outer fluid duct 4 surrounding the inner fluid duct 9 of the connector 2. Preferably and in the embodiment, the two fluid ducts 9, 10 of the connector 2 are arranged coaxially with one another. Each of the two fluid ducts 9, 10 are preferably and in the embodiment connected to a connecting branch 5, 6 of the connector 2. In this case in the embodiment, one connecting branch 6 is arranged transversely or perpendicularly to the longitudinal axis of the pipe 1 or to the longitudinal axis of the connector 2. This connecting branch 6 is expediently and in the embodiment connected to the outer fluid duct 10. A further connecting branch 5 forms a linear extension of the inner line 4 and of the inner fluid duct 9.

According to a preferred embodiment, the two connecting branches 5, 6 of the connector 2 are each connected to a metering device (not shown in the figures) for supplying the fluid medium in a metered fashion. In this case, this is expediently a metering device for an SCR catalytic converter system. The metering devices are preferably arranged at different points of the SCR catalytic converter system or the associated motor vehicle.

The invention claimed is:

1. A motor vehicle fluid line for conducting at least one fluid medium, wherein at least one fluid-carrying pipe and at least one fluid-carrying connector connected to the pipe are provided, wherein the pipe comprises, over at least part of its length L, a fluid-carrying outer line and a fluid-carrying inner line that is received in the outer line and extends along the outer line, wherein the outer line includes at least one heating element, wherein the at least one heating element is in the form of at least one of a heating wire and a planar heating element, and wherein the connector comprises a first connecting branch that is in fluid communication with the outer line, and a second connecting branch that is in fluid communication with the inner line.

2. The motor vehicle fluid line according to claim 1, wherein the pipe is directly connected to the fluid-carrying connector.

3. The motor vehicle fluid line according to claim 1, wherein at least one of the outer line and the inner line are material bonded to the connector.

4. The motor vehicle fluid line according to claim 3, wherein at least one of the outer line and the inner line are connected to the connector by means of at least one of a spin welded connection and a laser welded connection.

5. The motor vehicle fluid line according to claim 1, wherein the outer line is arranged substantially in parallel with the inner line.

6. The motor vehicle fluid line according to claim 1, wherein the outer line and the inner line are arranged substantially coaxially with one another.

7. The motor vehicle fluid line according to claim 1, wherein the pipe is merely formed as a single fluid duct over part of its length L and wherein the pipe is in the form of the outer line and the inner line over another part of its length L.

8. The motor vehicle fluid line according to claim 1, wherein the fluid medium flows or can flow through the outer line and the inner line in the same direction.

9. The motor vehicle fluid line according to claim 1, wherein the pipe is formed such that at least part of its length L is heated.

10. The motor vehicle fluid line according to claim 1, wherein the pipe is surrounded by a protective pipe.

11. The motor vehicle fluid line according to claim 1, wherein the connector comprises at least two parallel or substantially parallel fluid ducts, which fluid ducts are each connected to a connecting branch of the connector.

12. The motor vehicle fluid line according to claim 1, wherein a metering device for a metered supply of the fluid medium is provided on each connecting branch of the connector.

13. A method for producing a motor vehicle fluid line according to claim 1, wherein a connector is material bonded to an inner line, wherein the unit consisting of the connector and the inner line is then connected to an outer line, in which the inner line is introduced or inserted into the outer line and the outer line is then bonded to the connector, wherein the outer line comprises the at least one heating element and is surrounded by the at least one heating element, wherein the at least one heating element is formed as a heating wire.

14. The motor vehicle fluid line according to claim 1, wherein the heating element surrounds the outer line.

* * * * *